United States Patent
Venugopal et al.

(10) Patent No.: US 11,950,288 B2
(45) Date of Patent: Apr. 2, 2024

(54) SINGLE FREQUENCY NETWORK RANDOM ACCESS CHANNEL BEAM REFINEMENT

(71) Applicant: QUALCOMM Incorporated, San Diego, CA (US)

(72) Inventors: Kiran Venugopal, Raritan, NJ (US); Wooseok Nam, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/115,394

(22) Filed: Dec. 8, 2020

(65) Prior Publication Data

US 2022/0183066 A1   Jun. 9, 2022

(51) Int. Cl.
H04W 74/08   (2009.01)
H04W 56/00   (2009.01)
H04W 74/0833   (2024.01)

(52) U.S. Cl.
CPC ..... *H04W 74/0833* (2013.01); *H04W 56/001* (2013.01)

(58) Field of Classification Search
CPC ........... H04W 74/0833; H04W 56/001; H04W 74/0891; H04W 56/0015; H04B 7/0695
See application file for complete search history.

(56) References Cited

U.S. PATENT DOCUMENTS

| 2008/0225785 | A1* | 9/2008 | Wang ................. H04W 74/002 370/329 |
| 2018/0176958 | A1* | 6/2018 | Islam ............... H04W 74/0833 |
| 2019/0029049 | A1 | 1/2019 | Akkarakaran et al. |
| 2020/0059967 | A1 | 2/2020 | Kim et al. |
| 2021/0051672 | A1* | 2/2021 | Rastegardoost .... H04W 74/006 |

FOREIGN PATENT DOCUMENTS

| WO | WO-2018118491 A1 | 6/2018 |
| WO | WO-2021207756 | 10/2021 |

OTHER PUBLICATIONS

CATT: "NR RACH Procedure", 3GPP Draft, 3GPP TSG RAN WG1 Meeting #87, R1-1611375, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016 (Nov. 13, 2016), XP051175356, 4 pages, Retrieved from the Internet: URL: http://www.3gpp.org/ftp/Meetings_3GPP_SYNC/RAN1/Docs/ [Retrieved on Nov. 13, 2016], figures 1-3.
International Search Report and Written Opinion—PCT/US2021/071970—ISA/EPO—dated Feb. 22, 2022.

(Continued)

*Primary Examiner* — Dinh Nguyen
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive an indication that a base station supports single frequency network (SFN) radio access channel (RACH) beam refinement. The UE may receive a transmission, as part of a RACH operation, the transmission having SFN enabled or having SFN not enabled. Numerous other aspects are provided.

30 Claims, 9 Drawing Sheets

(56) References Cited

OTHER PUBLICATIONS

Nokia, et al., "NR 4-Step RACH Procedure", 3GPP TSG-RAN WG1#89, R1-1708244_NR 4 Step RACH Procedure, 3rd Generation Partnership Project (3GPP), Mobile Competence Centre; 650, Route Des Lucioles, F-06921 Sophia-Antipolis Cedex, France, vol. RAN WG1, No. Hangzhou, China, May 15, 2017-May 19, 2017, May 14, 2017 (May 14, 2017), 12 Pages, XP051273438, Retrieved from the Internet: URL: http://www.3gpp.org/ftp/Meetings_3GPP_SYNC/RAN1/Docs/ [retrieved on May 14, 2017], Section 2.1, p. 3/12.

* cited by examiner

SINGLE FREQUENCY NETWORK RANDOM ACCESS CHANNEL BEAM REFINEMENT

FIELD OF THE DISCLOSURE

Aspects of the present disclosure generally relate to wireless communication and to techniques and apparatuses for single frequency network random access channel beam refinement.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication that a base station supports single frequency network (SFN) radio access channel (RACH) beam refinement; and receiving a transmission, as a part of a RACH operation, the transmission having SFN enabled or having SFN not enabled.

In some aspects, a method of wireless communication performed by a base station includes transmitting an indication that the base station supports SFN RACH beam refinement; and transmitting a transmission, as a part of a RACH operation, the transmission having SFN enabled or having SFN not enabled.

In some aspects, a UE for wireless communication includes a memory; and one or more processors operatively coupled to the memory, the memory and the one or more processors configured to: receive an indication that a base station supports SFN RACH beam refinement; and receive a transmission, as a part of a RACH operation, the transmission having SFN enabled or having SFN not enabled.

In some aspects, a base station for wireless communication includes a memory; and one or more processors operatively coupled to the memory, the memory and the one or more processors configured to: transmit an indication that the base station supports SFN RACH beam refinement; and transmit a transmission, as a part of a RACH operation, the transmission having SFN enabled or having SFN not enabled.

In some aspects, a non-transitory computer-readable medium storing a set of instructions for wireless communication includes one or more instructions that, when executed by one or more processors of a UE, cause the UE to: receive an indication that a base station supports SFN RACH beam refinement; and receive a transmission, as a part of a RACH operation, the transmission having SFN enabled or having SFN not enabled.

In some aspects, a non-transitory computer-readable medium storing a set of instructions for wireless communication includes one or more instructions that, when executed by one or more processors of a base station, cause the base station to: transmit an indication that the base station supports SFN RACH beam refinement; and transmit a transmission, as a part of a RACH operation, the transmission having SFN enabled or having SFN not enabled.

In some aspects, an apparatus for wireless communication includes receiving an indication that a base station supports SFN RACH beam refinement; and means for receiving a transmission, as a part of a RACH operation, the transmission having SFN enabled or having SFN not enabled.

In some aspects, an apparatus for wireless communication includes means for transmitting an indication that the base station supports SFN RACH beam refinement; and means for transmitting a transmission, as a part of a RACH operation, the transmission having SFN enabled or having SFN not enabled.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
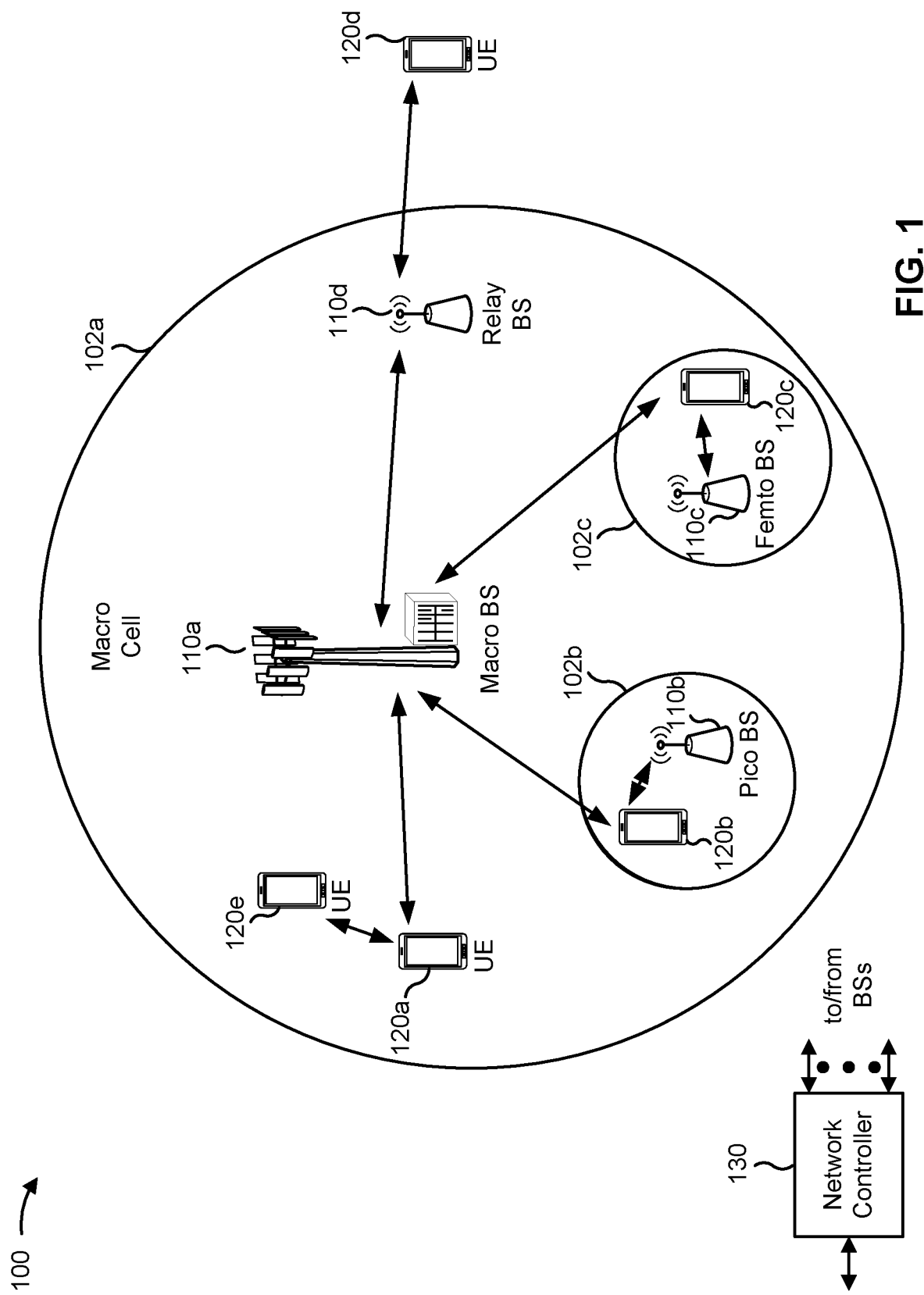
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
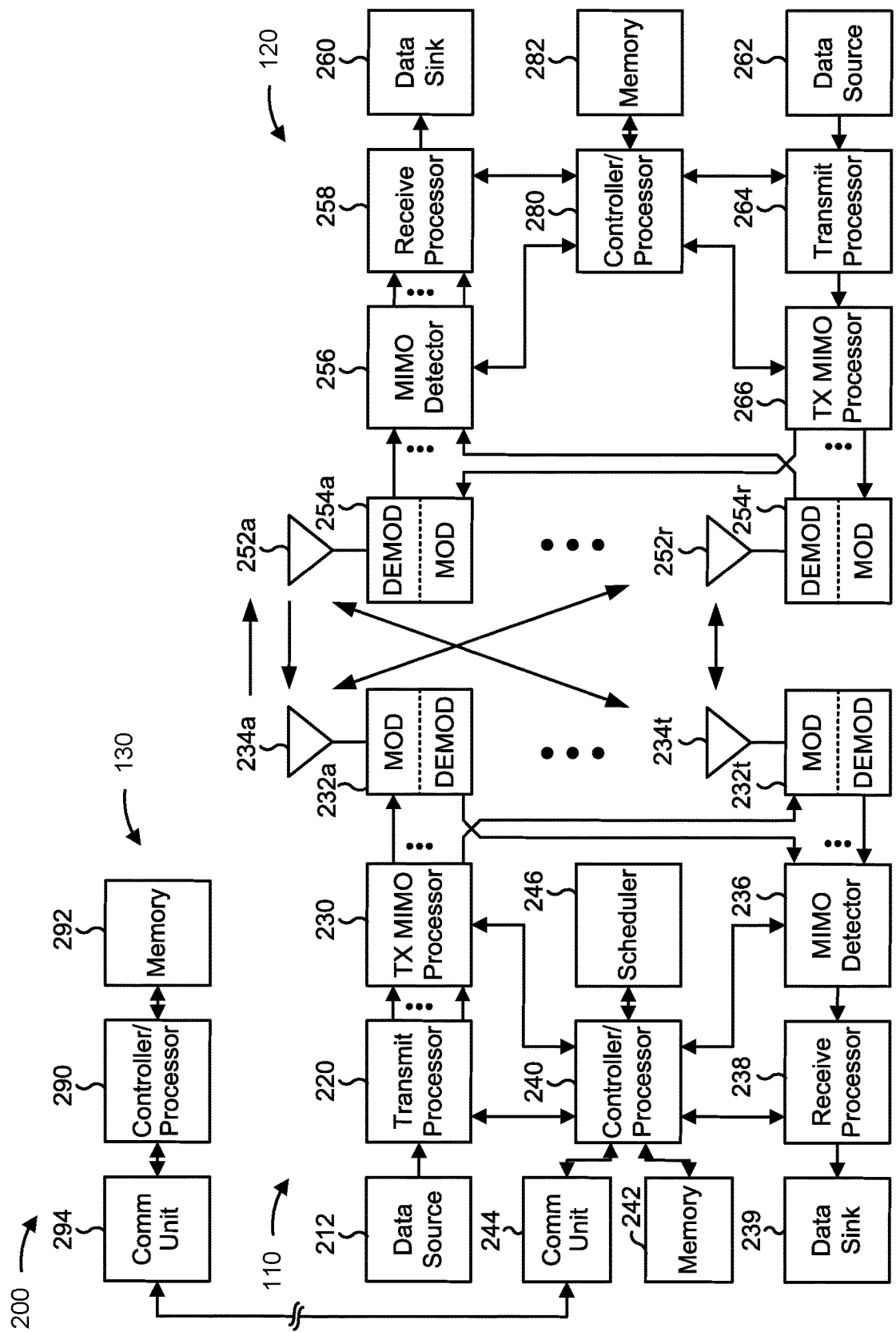
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with single frequency network random access channel beam refinement, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving an indication that a base station supports SFN RACH beam refinement (e.g., using antenna 252, DEMOD 254, MIMO detector 256, receive processor 258, controller/processor 280, and/or memory 282, among other examples); or means for receiving a transmission, as a part of a RACH operation, the transmission having SFN enabled or having SFN not enabled (e.g., using antenna 252, DEMOD 254, MIMO detector 256, receive processor 258, controller/processor 280, memory 282, transmit processor 264, TX MIMO processor 266, MOD 254, and/or antenna 252, among other examples). The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving a synchronization signal block (SSB) associated with RACH beam refinement and having SFN enabled, means for transmitting a RACH message associated with the SSB, and means for determining, based at least in part on the SSB having SFN enabled, that a subsequent RACH message is to be transmitted by the base station via an SFN transmission using multiple TRPs associated with the base station.

In some aspects, the UE includes means for receiving a SSB associated with RACH beam refinement and not having SFN enabled, means for transmitting a first RACH message associated with the SSB, and means for transmitting a second RACH message that indicates an SFN-based beam that is requested for a subsequent RACH message.

In some aspects, the UE includes means for receiving a SSB associated with RACH beam refinement and not having SFN enabled, means for transmitting a first RACH message associated with the SSB, means for transmitting a second RACH message that indicates multiple SFN-based beams that are requested for a subsequent RACH message, and means for receiving the subsequent RACH message via the multiple SFN-based beams.

In some aspects, the UE includes means for receiving one or more SSBs associated with RACH beam refinement and not having SFN enabled, means for transmitting a set of RACH messages associated with the one or more SSBs via one or more RACH occasions, and means for receiving a subsequent RACH message via an SFN-based beam.

In some aspects, the UE includes means for transmitting the set of RACH messages based at least in part on a configured preamble hopping sequence that indicates that the set of RACH messages are associated with the UE, or means for transmitting the set of RACH messages based at least in part on a configured frequency hopping sequence that indicates that the set of RACH messages are associated with the UE.

In some aspects, the base station includes means for transmitting an indication that the base station supports SFN RACH beam refinement (e.g., using controller/processor 240, transmit processor 220, TX MIMO processor 230, MOD 232, antenna 234, and/or memory 242, among other examples); or means for transmitting a transmission, as a part of a RACH operation, the transmission having SFN enabled or having SFN not enabled (e.g., using controller/processor 240, transmit processor 220, TX MIMO processor 230, MOD/DEMOD 232, antenna 234, memory 242, MIMO detector 236, and/or receive processor 238, among other examples). The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting a SSB associated with RACH beam refinement and having SFN enabled, means for receiving a RACH message associated with the SSB, and means for transmitting, based at least in part on the SSB having SFN enabled, a subsequent RACH message via an SFN transmission using multiple TRPs.

In some aspects, the base station includes means for transmitting a SSB associated with RACH beam refinement and not having SFN enabled, means for receiving a first RACH message associated with the SSB, and means for receiving a second RACH message that indicates an SFN-based beam that is requested for a subsequent RACH message.

In some aspects, the base station includes means for transmitting a SSB associated with RACH beam refinement and not having SFN enabled, means for receiving a first RACH message associated with the SSB, means for receiving a second RACH message that indicates multiple SFN-based beams that are requested for a subsequent RACH message, and means for transmitting the subsequent RACH message via the multiple SFN-based beams.

In some aspects, the base station includes means for transmitting one or more SSBs associated with RACH beam refinement and not having SFN enabled, means for receiving a set of RACH messages associated with the one or more SSBs via one or more RACH occasions, and means for determining that the set of RACH messages are associated with a single UE.

In some aspects, the base station includes means for determining that the set of RACH messages are associated with a single UE based at least in part on one or more of: means for receiving the set of RACH messages with a configured preamble hopping sequence, or means for receiving the set of RACH messages with a configured frequency hopping sequence.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
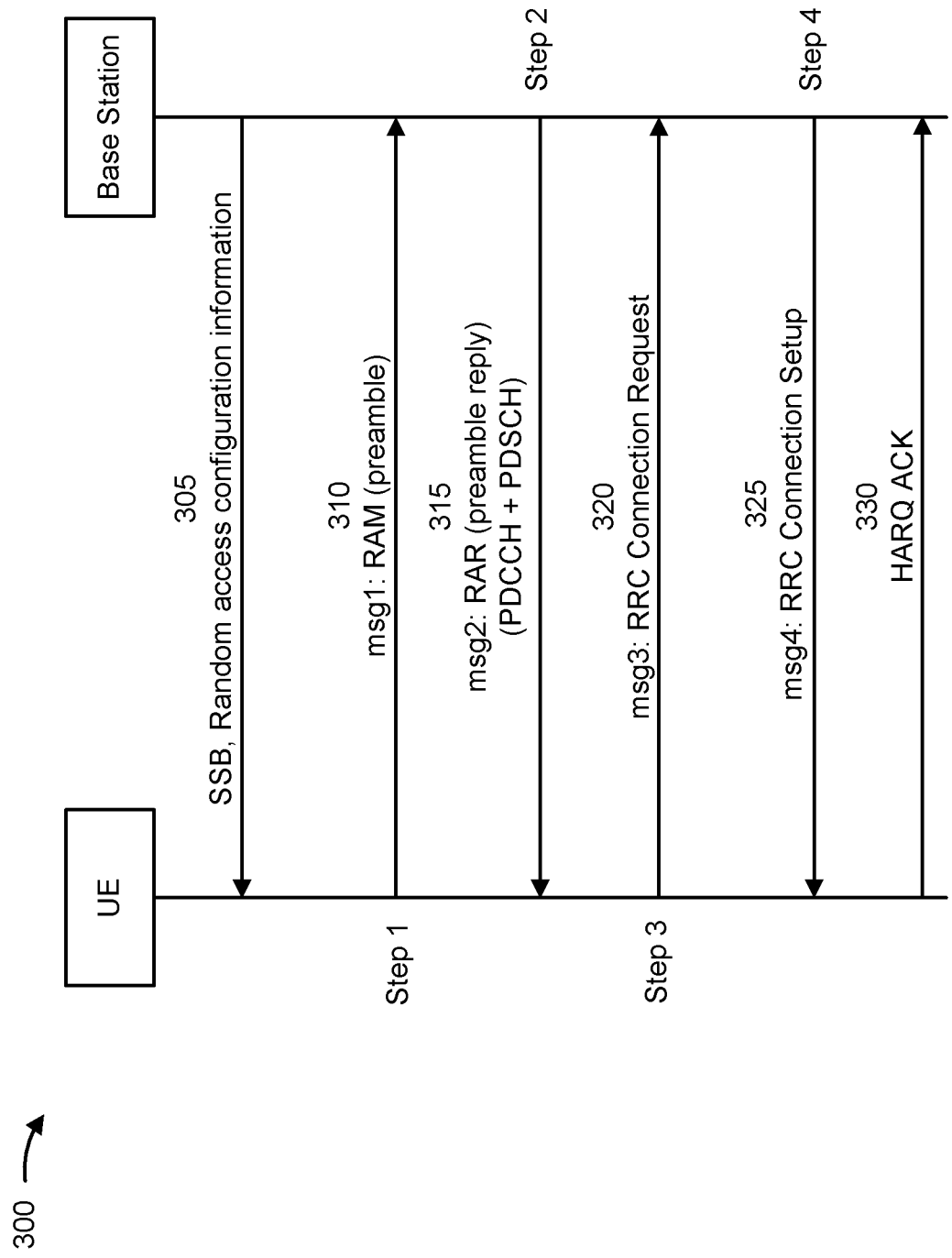
FIG. 3 is a diagram illustrating an example of a 4-step random access procedure, in accordance with various aspects of the present disclosure.

FIG. 3 is a diagram illustrating an example of a 4-step random access procedure, in accordance with various aspects of the present disclosure. As shown in FIG. 3, a base station and a UE may communicate with one another to perform the 4-step random access procedure.

As shown by reference number 305, the base station may transmit, and the UE may receive, one or more SSBs and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the random access procedure, such as one or more parameters for transmitting a random access message (RAM), one or more parameters for receiving a random access response (RAR), and/or the like.

As shown by reference number 310, the UE may transmit a RAM, which may include a preamble (sometimes referred to as a random access preamble, a physical RACH (PRACH) preamble, a RAM preamble, and/or the like). The message that includes the preamble may be referred to as a message 1, msg1, MSG1, a first message, an initial message, and/or the like in a 4-step random access procedure. The random access message may include a random access preamble identifier.

As shown by reference number 315, the base station may transmit an RAR as a reply to the preamble. The message that includes the RAR may be referred to as message 2, msg2, MSG2, or a second message in a 4-step random access procedure. In some aspects, the RAR may indicate the detected random access preamble identifier (e.g., received from the UE in msg1). Additionally, or alternatively, the RAR may indicate a resource allocation to be used by the UE to transmit message 3 (msg3).

In some aspects, as part of the second step of the 4-step random access procedure, the base station may transmit a PDCCH communication for the RAR. The PDCCH communication may schedule a physical downlink shared channel (PDSCH) communication that includes the RAR. For example, the PDCCH communication may indicate a resource allocation for the PDSCH communication. Also, as part of the second step of the 4-step random access procedure, the base station may transmit the PDSCH communication for the RAR, as scheduled by the PDCCH communication. The RAR may be included in a medium access control (MAC) protocol data unit (PDU) of the PDSCH communication.

As shown by reference number 320, the UE may transmit an RRC connection request message. The RRC connection request message may be referred to as message 3, msg3, MSG3, or a third message of a 4-step random access procedure. In some aspects, the RRC connection request may include a UE identifier, uplink control information (UCI), a physical uplink shared channel (PUSCH) communication (e.g., an RRC connection request), and/or the like.

As shown by reference number 325, the base station may transmit an RRC connection setup message. The RRC connection setup message may be referred to as message 4, msg4, MSG4, or a fourth message of a 4-step random access procedure. In some aspects, the RRC connection setup message may include the detected UE identifier, a timing advance value, contention resolution information, and/or the like. As shown by reference number 330, if the UE successfully receives the RRC connection setup message, the UE may transmit a hybrid automatic repeat request (HARQ) acknowledgement (ACK).

As indicated above, FIG. 3 is provided as an example. Other examples may differ from what is described with regard to FIG. 3.

Figure 4:
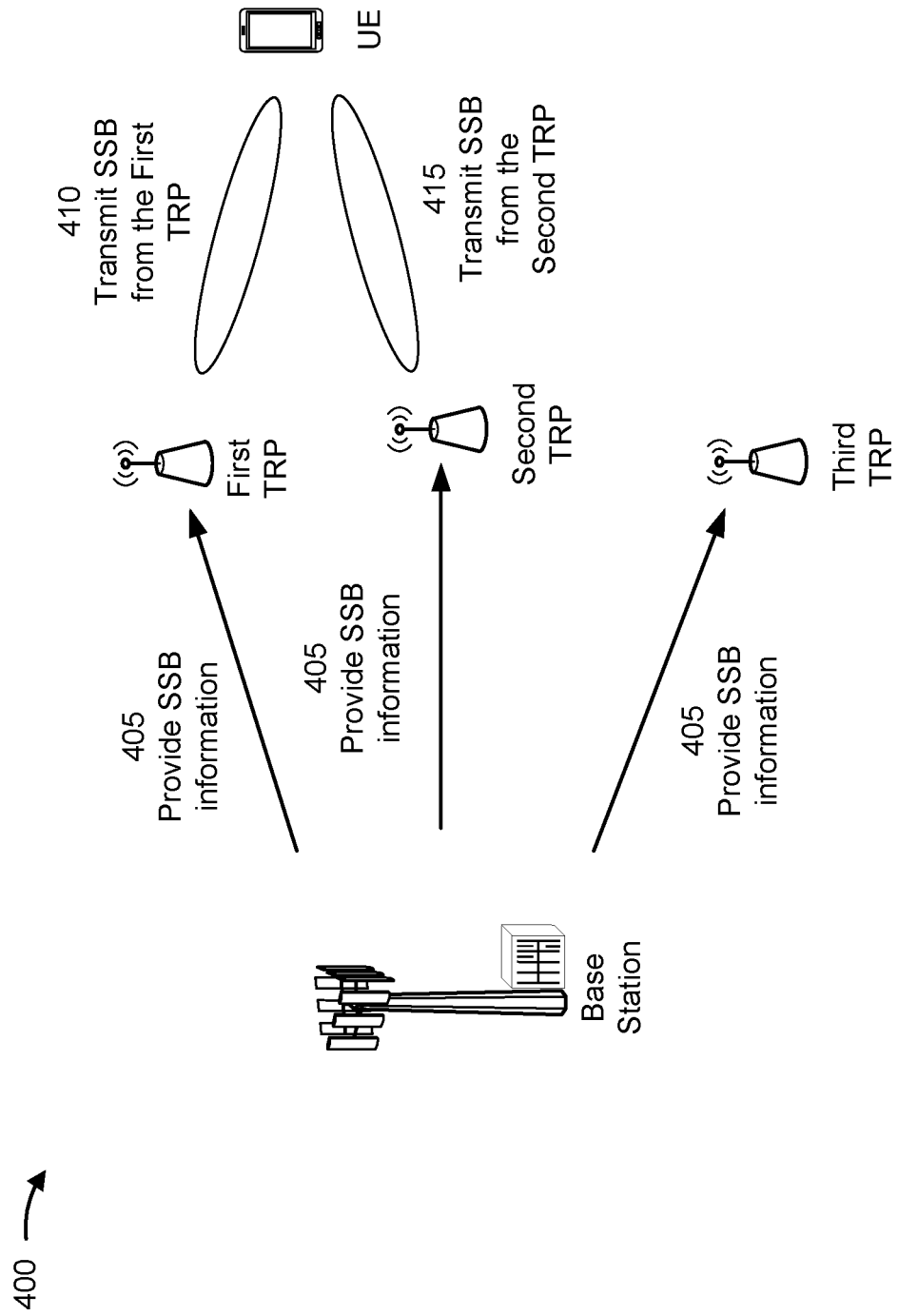
FIG. 4 is a diagram illustrating an example associated with transmission of synchronization signal blocks via a single frequency network, in accordance with various aspects of the present disclosure.

FIG. 4 is a diagram illustrating an example 400 associated with transmissions of SSBs via a single frequency network, in accordance with various aspects of the present disclosure. As shown in FIG. 4, a base station, multiple TRPs and a UE may communicate via a wireless network. The base station may provide an SFN via the multiple TRPs. For example, the base station may configure the multiple TRPs to communicate with the UE and/or additional UEs, using a same time-frequency resource, to transmit and/or receive a same set of data. Based at least in part on the base station providing an SFN, the UE may communicate with the base station via one or more of the multiple TRPs using a same time-frequency resource. The multiple TRPs may be associated with the base station and/or may have a same physical cell identification (PCI).

As shown by reference number 405, the base station may provide SSB information to a first TRP, a second TRP, and a third TRP, among other examples. The SSB information may include system information (e.g., associated with a master information block (MIB)) and/or synchronization information, among other examples. The SSB information may include information needed for a UE to establish a connection with the base station.

As shown by reference number 410, the first TRP may transmit an SSB (e.g., including the SSB information) via a transmit beam of the first TRP, and the UE may receive the SSB via a first receive beam of the UE.

As shown by reference number 415, the second TRP may transmit an SSB (e.g., including the SSB information) via a transmit beam of the second TRP, and the UE may receive the SSB via a second receive beam of the UE.

The UE may use the SSB information received from the first TRP and the SSB information received from the second TRP to initiate a RACH process to establish a connection with the base station via the first TRP or the second TRP. However, in some networks (e.g., in high speed scenarios) in which the base station provides an SFN to compensate for channel conditions and/or mobility conditions, the UE and/or the base station may have difficulty in performing the RACH processes via the first TRP or the second TRP. For example, the base station may fail to receive a RACH message from the UE and/or the UE may fail to receive a RACH message from the base station. Based at least in part on the base station and/or the UE not receiving a RACH message, the RACH process may fail, and the UE may fail to establish a connection with the base station. The UE and/or the base station may consume additional resources to repeat an attempt to establish a connection with the base station using a RACH process via the first TRP or the second TRP.

As indicated above, FIG. 4 is provided as an example. Other examples may differ from what is described with regard to FIG. 4.

In some aspects described herein, a base station may indicate support for SFN RACH beam refinement in RACH configuration information. The base station may indicate support within a system information block (SIB) and/or an SSB, among other examples. In some aspects, a UE may receive the SIB and/or the SSB and may use the indication of support for SFN RACH beam refinement to determine whether RACH messages are to be transmitted using and SFN configuration from multiple TRPs. In some aspects, the base station and the UE may communicate RACH messages with a reduced likelihood of errors based at least in part on gains associated with an SFN. This may reduce failed attempts by the UE to establish a connection with the base station, which may conserve power, network, communication, and/or computing resources that may otherwise have been used to repeat an attempt to establish a connection with the base station using a RACH process via the first TRP or the second TRP.

Figure 5:
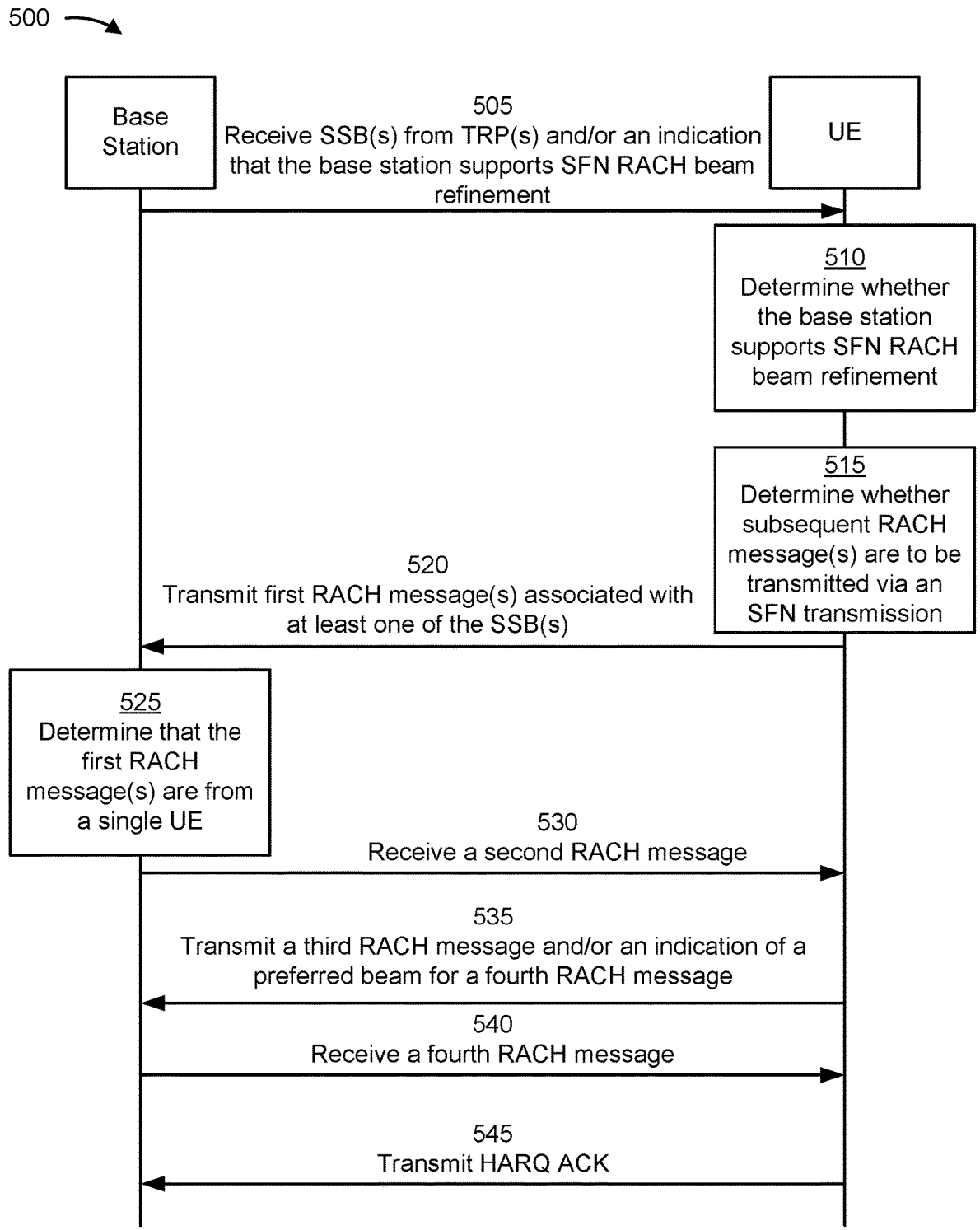
FIG. 5 is a diagram illustrating an example associated with single frequency network random access channel beam refinement, in accordance with various aspects of the present disclosure.

FIG. 5 is a diagram illustrating an example 500 associated with single frequency network random access channel beam refinement, in accordance with various aspects of the present disclosure. As shown in FIG. 5, a UE (e.g., UE 120) may communicate with a base station (e.g., base station 110). The UE and the base station may be part of a wireless network (e.g., wireless network 100). In some aspects, the UE and the base station may perform one or more beam management procedures.

As shown by reference number 505, the base station may transmit, and the UE may receive, one or more SSBs from one or more TRPs and/or an indication that the base station supports SFN RACH beam refinement.

In some aspects, the one or more SSBs may include the indication that the base station supports SFN RACH beam refinement. In some aspects, receiving the one or more SSBs may include receiving a transmission, as part of a RACH operation (e.g., including information for the UE to initiate a RACH procedure), with the transmission (e.g., the one or more SSBs) having SFN enabled or having SFN not enabled. In some aspects, the one or more SSBs may include the indication that the base station supports SFN RACH beam refinement. For example, the one or more SSBs may include an explicit indication that the base station supports SFN RACH beam refinement (e.g., a flag and/or a bit-based indicator, among other examples) and/or may include an implicit indication that the base station supports SFN RACH beam refinement (e.g., implied based at least in part on the SSBs indicating that SFN is enabled).

In some aspects, receiving the indication that the base station supports SFN RACH beam refinement may include receiving a transmission, as part of a RACH operation (e.g., including information for the RACH procedure), with the transmission having SFN enabled or having SFN not enabled. For example, the indication may include an implicit indication that SFN is enabled and/or may include an explicit indication that SFN is enabled.

In some aspects, the one or more SSBs may provide information that the UE may use to obtain synchronization with the base station and/or to locate additional resources for obtaining system information blocks (e.g., SIBs, such as SIB1). The one or more SSBs, the SIBs, and/or other information may include RACH configuration information. In some aspects, the RACH configuration information may indicate support for SFN RACH beam refinement by indicating a RACH configuration that includes SFN RACH beam refinement. In some aspects, the RACH configuration information may indicate support for SFN RACH beam refinement by explicitly indicating support for SFN RACH beam refinement by, for example, using a single bit flag or a multi-bit flag within the configuration information.

In some implementations, support for SFN RACH beam refinement may be SSB-specific. In other words, the RACH configuration information may indicate support for SFN RACH beam refinement for specific SSBs (e.g., on beams associated with specific SSBs). In some aspects, the base station may support SFN RACH beam refinement for a first set of SSBs and not for a second set of SSBs.

In some aspects, the base station may transmit a first set of SSBs using individual TRPs (e.g., in a non-SFN configuration). In some aspects, the base station may transmit a second set of SSBs using multiple TRPs (e.g., in an SFN configuration). In some aspects, one or more SSBs of the first set of SSBs or the second set of SSBs may include the indication of support for SFN RACH beam refinement.

The RACH configuration information may include indications of RACH resources, a RACH type (e.g., 2-step RACH or 4-step RACH), and/or whether the base station supports SFN RACH beam refinement, repetitions for transmitting RACH messages, and/or beam sweeping of RACH messages, among other examples.

SFN RACH beam refinement may include a RACH process during which the base station and/or the UE begin communicating, using SFN downlink transmissions (e.g., using multiple TRPs), with rough beams (e.g., relatively wide beams and/or multiple beams that span a relatively wide area (e.g., using beam sweeping)). During operations of the RACH procedure, the base station and/or the UE may determine refined beams (e.g., relatively narrow beams and/or beams with improved configurations to support SFN-based transmission and/or reception) to use for subsequent communications (e.g., associated with one or more TRPs). In some aspects, the base station and/or the UE may determine relatively narrow beams to use for subsequent communications based at least in part on feedback from the UE and/or the base station on a previous communication (e.g., using the rough beams).

As shown by reference number 510, the UE may determine whether the base station supports SFN RACH beam refinement. In some aspects, the UE may determine whether the base station supports SFN RACH beam refinement based at least in part on the indication from the base station. In some aspects, the UE may identify the indication within an SSB and/or within a SIB1, among other examples.

As shown by reference number 515, the UE may determine whether one or more subsequent RACH messages are to be transmitted by the base station (e.g., downlink RACH messages) via an SFN transmission. In some aspects, the UE may determine, based at least in part on the indication from the base station, that one or more subsequent RACH messages are to be transmitted via an SFN transmission via multiple TRPs associated with the base station.

In some aspects, an SSB may indicate support for SFN RACH beam refinement. In some aspects, the SSB may indicate (e.g., via a flag) that the SSB, associated with RACH beam refinement, is transmitted via an SFN transmission (e.g., SFN is enabled). The UE may determine, based at least in part on the SSB having SFN enabled, that one or more subsequent RACH messages transmitted by the base station (e.g., downlink RACH messages) are to be transmitted via an SFN transmission using multiple TRPs. For example, a second RACH message (e.g., msg2) transmitted by the base station in response to a first RACH message (e.g., msg1) is to be transmitted via an SFN transmission. Additionally, or alternatively, a fourth RACH message (e.g., msg4) transmitted by the base station in response to a third RACH message (e.g., msg3) is to be transmitted via an SFN transmission.

In some aspects, an SSB may indicate support for SFN RACH beam refinement and may indicate (e.g., via a flag) that the SSB, associated with RACH beam refinement, is not transmitted via an SFN transmission (e.g., SFN is not enabled). The UE may determine that the fourth RACH message is to be transmitted via an SFN transmission using multiple TRPs. The UE may determine that the UE is to provide feedback to the base station in the third RACH message to indicate one or more beams to use for transmission of the fourth RACH message via an SFN transmission.

As shown by reference number 520, the UE may transmit, and the base station may receive, one or more first RACH messages (e.g., msg1) associated with at least one of the one or more SSBs. In some aspects, a first RACH message may be associated with an SSB (e.g., an SFN-based SSB or a non-SFN-based SSB). In some aspects, multiple first RACH messages may be associated with respective SSBs. In some aspects, each first RACH message is associated with a single SSB, which may be an SFN-based SSB or a non-SFN-based SSB.

In some aspects, the UE may transmit multiple first RACH messages (e.g., msg1) using multiple RACH occasions (e.g., resources associated with resources for UEs to transmit first RACH messages). The UE may transmit the multiple first RACH messages within RACH response (e.g., random access response (RAR)) windows associated with the RACH occasions and/or associated beams.

In some aspects, the UE may transmit the multiple first RACH messages (e.g., a set of RACH messages) based at least in part on a configured preamble hopping sequence that indicates that the multiple first RACH messages are associated with the UE. In some aspects, the UE may be configured with the preamble hopping sequence via a configured telecommunication standard and/or one or more RRC messages during a previous connection, among other examples. The preamble hopping sequence may indicate preambles to be selected by the UE for transmission with the multiple first RACH messages. In some aspects, a preamble of a first message of the multiple first RACH messages may have a configured relationship with a preamble of a second message of the multiple first RACH messages. In some aspects, the preamble of the second message of the multiple first RACH messages may have a configured relationship with a preamble of a third message of the multiple first RACH messages, and/or the like.

In some aspects, the UE may transmit the multiple first RACH messages (e.g., a set of RACH messages) based at least in part on a configured frequency hopping sequence that indicates that the multiple first RACH messages are associated with the UE. In some aspects, the UE may use the configured frequency hopping scheme based at least in part on associated RACH occasions being frequency division multiplex (e.g., simultaneous on different frequencies). In some aspects, the UE may be configured with the frequency hopping sequence via a configured telecommunication standard and/or one or more RRC messages during a previous connection, among other examples. The frequency hopping sequence may indicate frequencies to be selected by the UE for transmitting the multiple first RACH messages during one or more RACH occasions. In some aspects, a frequency of a first message of the multiple first RACH messages may have a configured relationship with a frequency of a second message of the multiple first RACH messages. The frequency of the second message of the multiple first RACH messages may have a configured relationship with a frequency of a third message of the multiple first RACH messages, and/or the like.

As shown by reference number 525, the base station may determine that the one or more first RACH messages are from a single UE. In some aspects, the base station may determine that the one or more first RACH messages are from a single UE based at least in part on determining that the one or more first RACH messages have a configured preamble hopping sequence and/or a configured frequency hopping sequence.

As shown by reference number 530, the UE may receive, and the base station may transmit, a second RACH message (e.g., msg2). In some aspects, the base station may transmit the second RACH message using an SFN-based transmission (e.g., using multiple TRPs). In some aspects, the base station may transmit the second RACH message using a non-SFN-based transmission (e.g., using a single TRP).

As shown by reference number 535, the UE may transmit, and the base station may receive a third RACH message and/or an indication of a preferred beam for a fourth RACH message (e.g., msg4). In some aspects, the UE may transmit the third RACH message using a beam associated with the second RACH message. In some aspects, the beam associated with the second RACH message may be associated with an SSB of the one or more SSBs.

In some aspects, the UE may transmit the indication of the preferred beam for the fourth RACH message based at least in part on a measurement of the second RACH message. In some aspects, the preferred beam for the fourth RACH message may be a relatively narrow beam (e.g., a narrower beam than a beam used for the second RACH message). In some aspects, the preferred beam may be associated with an SFN-based beam to be transmitted using multiple TRPs.

In some aspects, the UE may transmit an indication of multiple preferred beams for the fourth RACH message. In some aspects, the UE may indicate a preference that the base station transmit the fourth RACH message using an SFN-based transmission using at least one of the multiple preferred beams (e.g., using multiple TRPs).

As shown by reference number 540, the UE may receive, and the base station may transmit, a fourth RACH message (e.g., msg4). The fourth RACH message may include an RRC connection setup message. In some aspects, the base station may transmit the fourth RACH message using an SFN-based beam associated with a preferred beam, as indicated by the UE. In some aspects, the base station may transmit the fourth RACH message using an SFN-based beam associated with at least one preferred beam (e.g., using multiple preferred beams), as indicated by the UE.

As shown by reference number 545, the UE may transmit, and the base station may receive, a hybrid automatic repeat request acknowledgement (HARQ ACK). In some aspects, the UE may transmit the HARQ ACK to indicate successful receipt of the fourth RACH message. Based at least in part on the UE transmitting the HARQ ACK message, the base station may determine that the UE RACH procedure is successful, and the UE is configured for subsequent communications.

Based at least in part on using SFN-based transmissions of RACH messages, the base station and the UE may communicate RACH messages with a reduced likelihood of errors based at least in part on gains associated with an SFN. This may reduce failed attempts by the UE to establish a connection with the base station, which may conserve power, network, communication, and/or computing resources that may otherwise have been used to repeat an attempt to establish a connection with the base station using a RACH process via the first TRP or the second TRP.

As indicated above, FIG. 5 is provided as an example. Other examples may differ from what is described with regard to FIG. 5.

Figure 6:
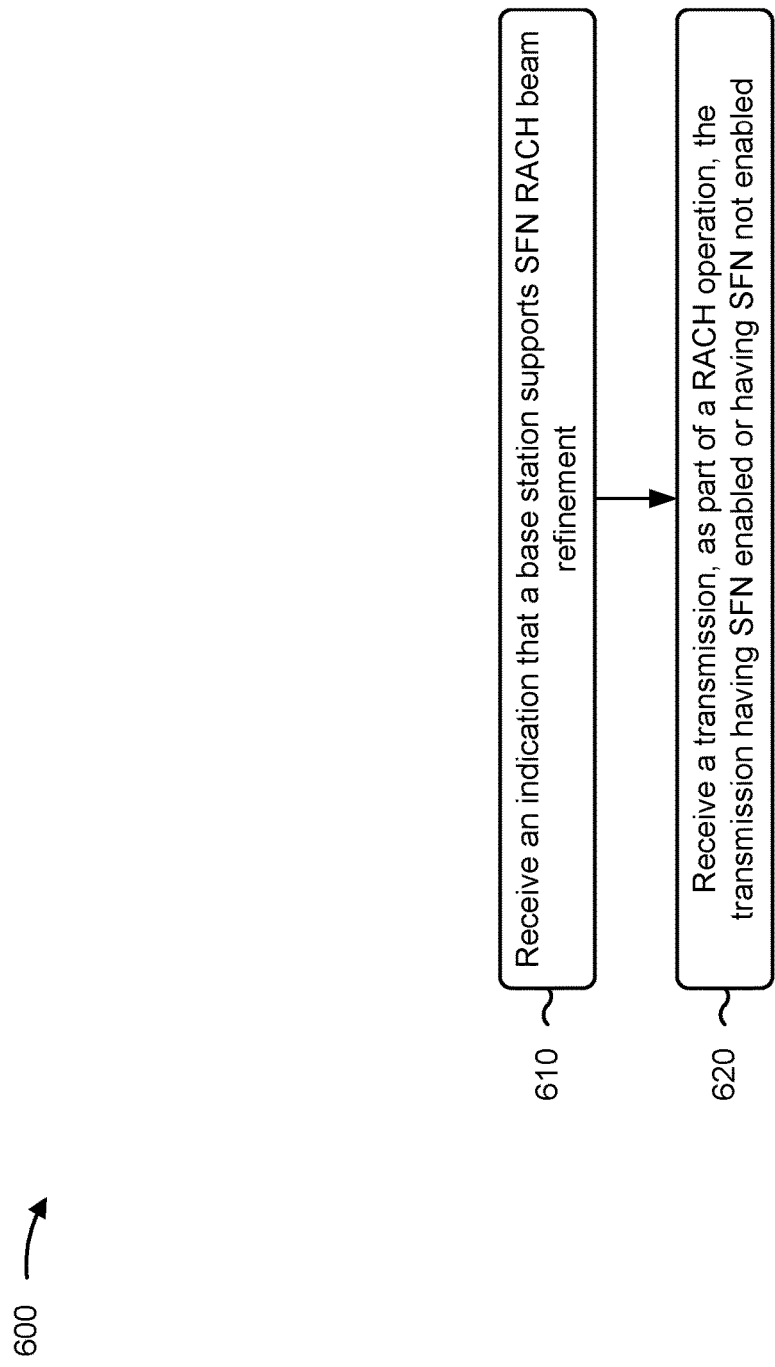
FIGS. 6 and 7 are diagrams illustrating example processes associated with single frequency network random access channel beam refinement, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with an SFN RACH beam refinement.

As shown in FIG. 6, in some aspects, process 600 may include receiving an indication that a base station supports SFN RACH beam refinement (block 610). For example, the UE (e.g., using reception component 802, depicted in FIG. 8) may receive an indication of whether a base station supports SFN RACH beam refinement, as described above, for example, with reference to FIG. 5.

As further shown in FIG. 6, in some aspects, process 600 may include receiving a transmission, as a part of a RACH operation, the transmission having SFN enabled or having SFN not enabled (block 620). For example, the UE (e.g., using reception component 802 and/or transmission component 804, depicted in FIG. 8) may receive a transmission, as a part of a RACH operation, the transmission having SFN enabled or having SFN not enabled, as described above, for example, with reference to FIG. 5.

Process 600 may include additional aspects, such as any single aspect or any combination of aspects described below and/or in connection with one or more other processes described elsewhere herein.

In a first aspect, the indication is associated with one or more synchronization signal blocks SSBs.

In a second aspect, alone or in combination with the first aspect, receiving the transmission having SFN enabled or having SFN not enabled comprises receiving a SSB associated with RACH beam refinement and having SFN enabled, and wherein the method further comprises transmitting a RACH message associated with the SSB, and determining, based at least in part on the SSB having SFN enabled, that a subsequent RACH message is to be transmitted via an SFN transmission using multiple TRPs.

In a third aspect, alone or in combination with one or more of the first and second aspects, receiving the transmission having SFN enabled or having SFN not enabled comprises receiving an SSB associated with RACH beam refinement and not having SFN enabled, and wherein the method further comprises transmitting a first RACH message associated with the SSB, and transmitting a second RACH message that indicates an SFN-based beam that is requested for a subsequent RACH message.

In a fourth aspect, alone or in combination with one or more of the first through third aspects, receiving the transmission having SFN enabled or having SFN not enabled comprises receiving an SSB associated with RACH beam refinement and not having SFN enabled, and wherein the method further comprises transmitting a first RACH message associated with the SSB, transmitting a second RACH message that indicates multiple SFN-based beams that are requested for a subsequent RACH message, and receiving the subsequent RACH message via the multiple SFN-based beams.

In a fifth aspect, alone or in combination with one or more of the first through fourth aspects, receiving the transmission having SFN enabled or having SFN not enabled comprises receiving one or more SSBs associated with RACH beam refinement and not having SFN enabled, and wherein the method further comprises transmitting a set of RACH messages associated with the one or more SSBs via one or more RACH occasions, and receiving a subsequent RACH message via an SFN-based beam.

In a sixth aspect, alone or in combination with one or more of the first through fifth aspects, transmitting the set of RACH messages associated with the one or more SSBs via the one or more RACH occasions comprises transmitting the set of RACH messages based at least in part on a configured preamble hopping sequence that indicates that the set of RACH messages are associated with the UE, or transmitting the set of RACH messages based at least in part on a configured frequency hopping sequence that indicates that the set of RACH messages are associated with the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
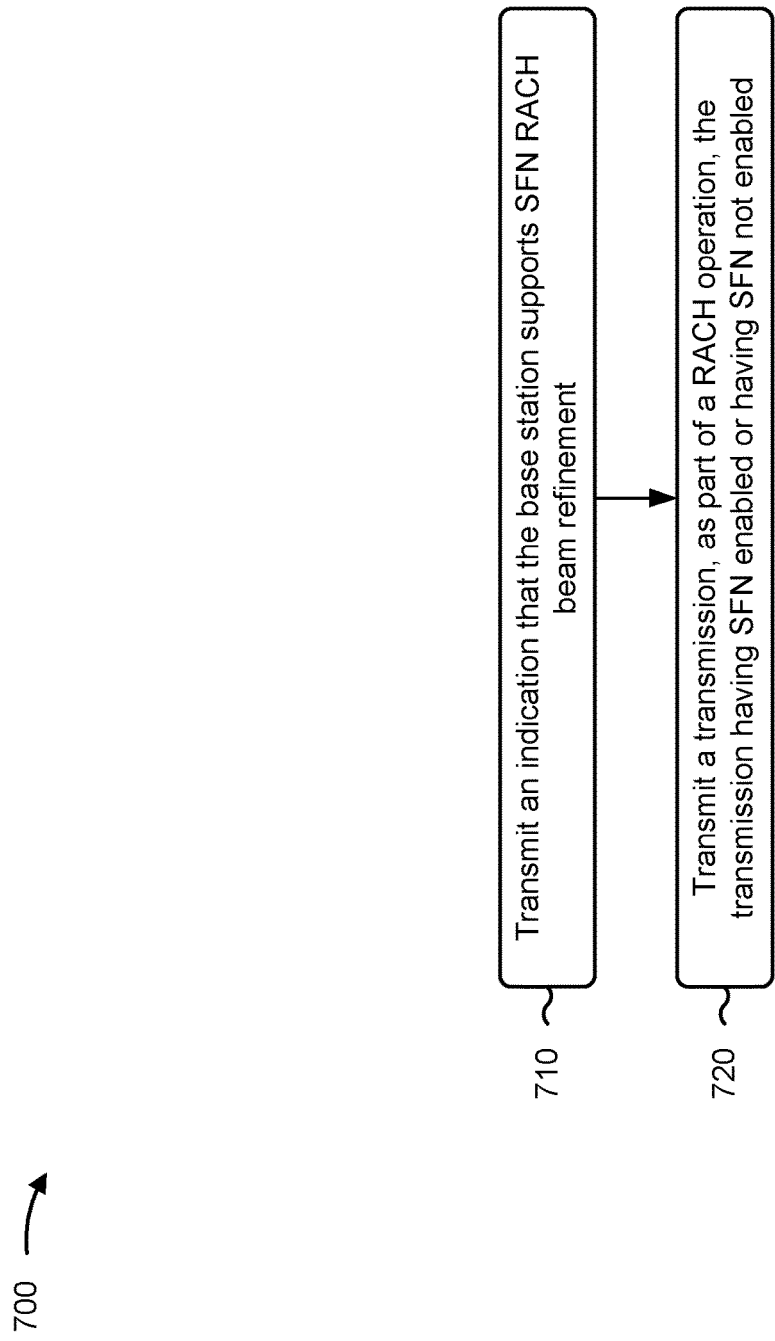

FIG. 7 is a diagram illustrating an example process 700 performed, for example, by a base station, in accordance with various aspects of the present disclosure. Example process 700 is an example where the base station (e.g., base station 110) performs operations associated with single frequency network random access channel beam refinement.

As shown in FIG. 7, in some aspects, process 700 may include transmitting an indication that the base station supports SFN RACH beam refinement (block 710). For example, the base station (e.g., using transmission component 904, depicted in FIG. 9) may transmit an indication that the base station supports SFN RACH beam refinement, as described above, for example, with reference to FIG. 5.

As further shown in FIG. 7, in some aspects, process 700 may include transmitting a transmission, as a part of a RACH operation, the transmission having SFN enabled or having SFN not enabled (block 720). For example, the base station (e.g., using transmission component 904, depicted in FIG. 9) may transmit a transmission, as a part of a RACH operation, the transmission having SFN enabled or having SFN not enabled, as described above, for example, with reference to FIG. 5.

Process 700 may include additional aspects, such as any single aspect or any combination of aspects described below and/or in connection with one or more other processes described elsewhere herein.

In a first aspect, the indication is associated with one or more synchronization signal blocks (SSBs).

In a second aspect, alone or in combination with the first aspect, transmitting the transmission having SFN enabled or having SFN not enabled comprises transmitting a synchronization signal block (SSB) associated with RACH beam refinement and having SFN enabled, and wherein the method further comprises receiving a RACH message associated with the SSB, and transmitting, based at least in part on the SSB having SFN enabled, a subsequent RACH message via an SFN transmission using multiple transmit receive points (TRPs).

In a third aspect, alone or in combination with one or more of the first and second aspects, transmitting the transmission having SFN enabled or having SFN not enabled comprises transmitting a synchronization signal block (SSB) associated with RACH beam refinement and not having SFN enabled, and wherein the method further comprises receiving a first RACH message associated with the SSB, and receiving a second RACH message that indicates an SFN-based beam that is requested for a subsequent RACH message.

In a fourth aspect, alone or in combination with one or more of the first through third aspects, transmitting the transmission having SFN enabled or having SFN not enabled comprises transmitting a synchronization signal block (SSB) associated with RACH beam refinement and not having SFN enabled, and wherein the method further comprises receiving a first RACH message associated with the SSB, receiving a second RACH message that indicates multiple SFN-based beams that are requested for a subsequent RACH message, and transmitting the subsequent RACH message via the multiple SFN-based beams.

In a fifth aspect, alone or in combination with one or more of the first through fourth aspects, transmitting the transmission having SFN enabled or having SFN not enabled comprises transmitting one or more synchronization signal blocks (SSBs) associated with RACH beam refinement and not having SFN enabled, and wherein the method further comprises receiving a set of RACH messages associated with the one or more SSBs via one or more RACH occasions, and determining that the set of RACH messages are associated with a single user equipment (UE).

In a sixth aspect, alone or in combination with one or more of the first through fifth aspects, determining that the set of RACH messages are associated with a single UE comprises determining that the set of RACH messages are associated with a single UE based at least in part on one or more of receiving the set of RACH messages with a configured preamble hopping sequence, or receiving the set of RACH messages with a configured frequency hopping sequence.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
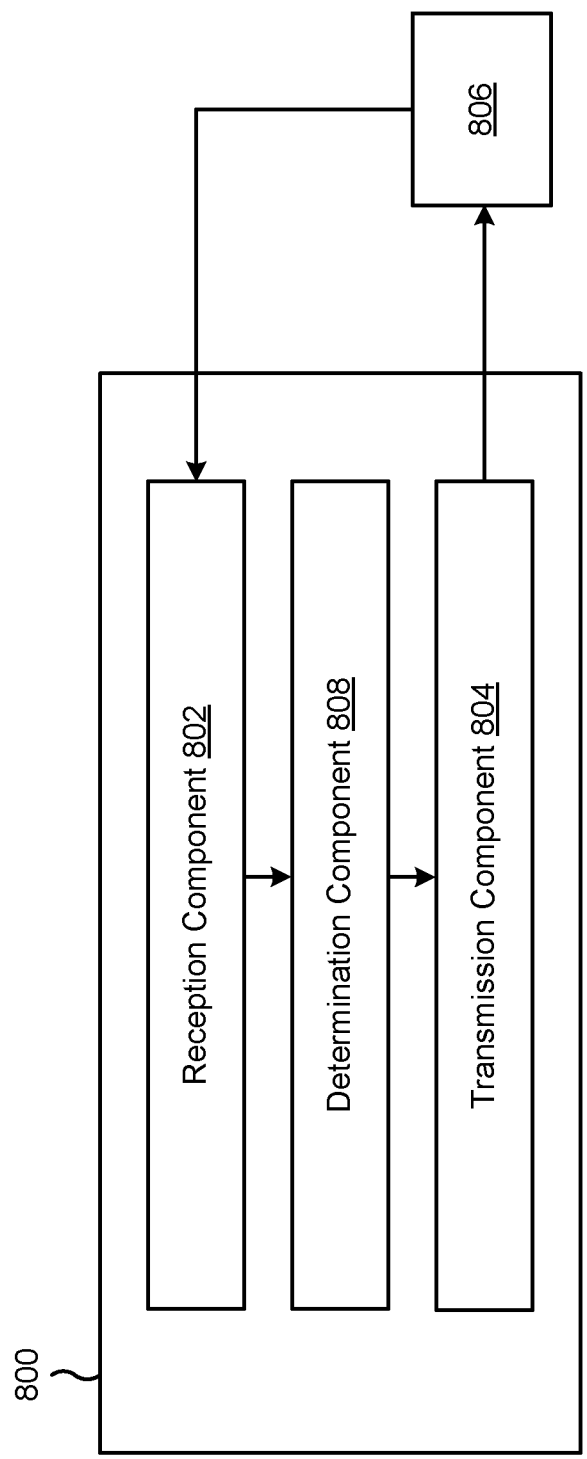
FIGS. 8 and 9 are block diagrams of example apparatuses for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive an indication of whether a base station supports SFN RACH beam refinement. The reception component 802 may receive a transmission, as a part of a RACH operation, the transmission having SFN enabled or having SFN not enabled.

The determination component 808 may determine, based at least in part on the SSB having SFN enabled, that a subsequent RACH message is to be transmitted via an SFN transmission using multiple TRPs.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
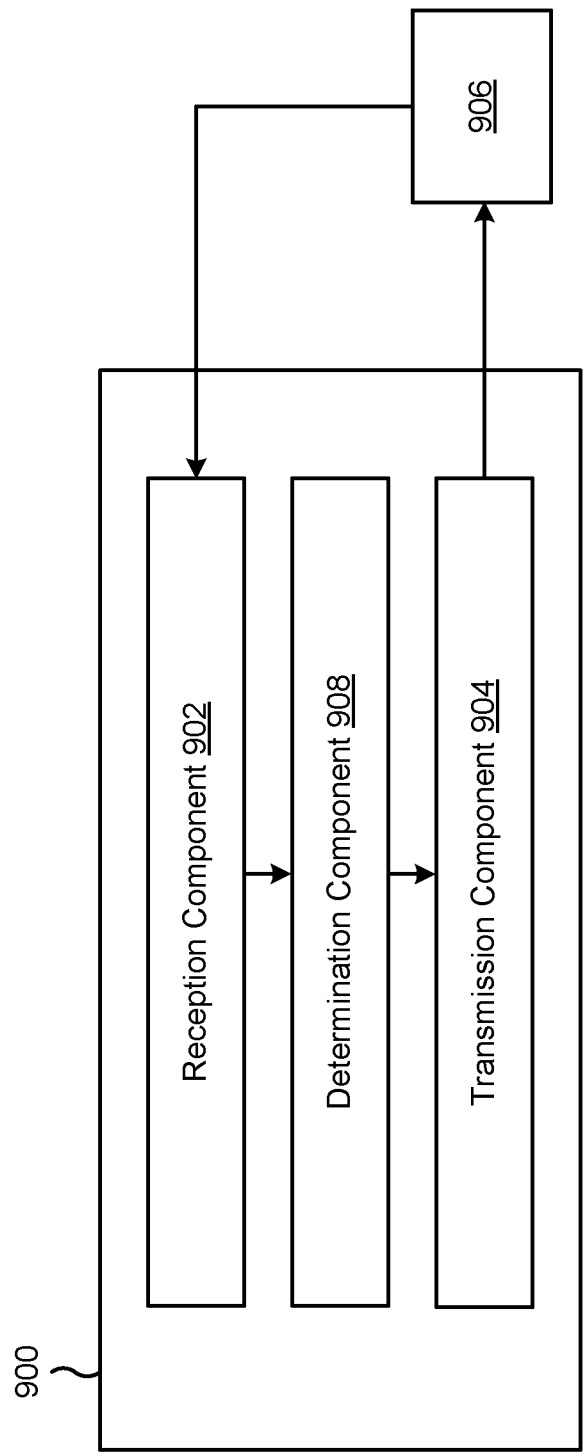

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit an indication that the base station supports SFN RACH beam refinement. The reception component 902 and/or transmission component 904 may transmit a transmission, as a part of a RACH operation, the transmission having SFN enabled or having SFN not enabled.

The determination component 908 may determine that a set of RACH messages are associated with a single UE.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of aspects of the present disclosure:

Aspect 1: A method of wireless communication performed by a user equipment (UE), comprising: receiving an indication that a base station supports single frequency network (SFN) radio access channel (RACH) beam refinement; and receiving a transmission, as part of a RACH operation, the transmission having SFN enabled or having SFN not enabled.

Aspect 2: The method of aspect 1, wherein the indication is associated with one or more synchronization signal blocks (SSBs).

Aspect 3: The method of any of aspects 1 through 2, wherein receiving the transmission having SFN enabled or having SFN not enabled comprises receiving a synchronization signal block (SSB) associated with RACH beam refinement and having SFN enabled, and wherein the method further comprises: transmitting a RACH message associated with the SSB, and determining, based at least in part on the SSB having SFN enabled, that a subsequent RACH message is to be transmitted via an SFN transmission using multiple transmit receive points (TRPs).

Aspect 4: The method of any of aspects 1 through 2, wherein receiving the transmission having SFN enabled or having SFN not enabled comprises receiving a synchronization signal block (SSB) associated with RACH beam refinement and not having SFN enabled, and wherein the method further comprises: transmitting a first RACH message associated with the SSB, and transmitting a second RACH message that indicates an SFN-based beam that is requested for a subsequent RACH message.

Aspect 5: The method of any of aspects 1 through 2, wherein receiving the transmission having SFN enabled or having SFN not enabled comprises receiving a synchronization signal block (SSB) associated with RACH beam refinement and not having SFN enabled, and wherein the method further comprises: transmitting a first RACH message associated with the SSB, transmitting a second RACH message that indicates multiple SFN-based beams that are requested for a subsequent RACH message, and receiving the subsequent RACH message via the multiple SFN-based beams.

Aspect 6: The method of any of aspects 1 through 2, wherein receiving the transmission having SFN enabled or having SFN not enabled comprises receiving one or more synchronization signal blocks (SSBs) associated with RACH beam refinement and not having SFN enabled, and wherein the method further comprises: transmitting a set of RACH messages associated with the one or more SSBs via one or more RACH occasions, and receiving a subsequent RACH message via an SFN-based beam.

Aspect 7: The method of aspect 6, wherein transmitting the set of RACH messages associated with the one or more SSBs via the one or more RACH occasions comprises: transmitting the set of RACH messages based at least in part on a configured preamble hopping sequence that indicates that the set of RACH messages are associated with the UE, or transmitting the set of RACH messages based at least in part on a configured frequency hopping sequence that indicates that the set of RACH messages are associated with the UE.

Aspect 8: A method of wireless communication performed by a base station, comprising: transmitting an indication that the base station supports single frequency network (SFN) radio access channel (RACH) beam refinement; and transmitting a transmission, as a part of a RACH operation, the transmission having SFN enabled or having SFN not enabled.

Aspect 9: The method of aspect 8, wherein the indication is associated with one or more synchronization signal blocks (SSBs).

Aspect 10: The method of any of aspects 8 through 9, wherein transmitting the transmission having SFN enabled or having SFN not enabled comprises transmitting a synchronization signal block (SSB) associated with RACH beam refinement and having SFN enabled, and wherein the method further comprises: receiving a RACH message associated with the SSB, and transmitting, based at least in part on the SSB having SFN enabled, a subsequent RACH message via an SFN transmission using multiple transmit receive points (TRPs).

Aspect 11: The method of any of aspects 8 through 9, wherein transmitting the transmission having SFN enabled or having SFN not enabled comprises transmitting a synchronization signal block (SSB) associated with RACH beam refinement and not having SFN enabled, and wherein the method further comprises: receiving a first RACH message associated with the SSB, and receiving a second RACH message that indicates an SFN-based beam that is requested for a subsequent RACH message.

Aspect 12: The method of any of aspects 8 through 9, wherein transmitting the transmission having SFN enabled or having SFN not enabled comprises transmitting a synchronization signal block (SSB) associated with RACH beam refinement and not having SFN enabled, and wherein the method further comprises: receiving a first RACH message associated with the SSB, receiving a second RACH message that indicates multiple SFN-based beams that are requested for a subsequent RACH message, and transmitting the subsequent RACH message via the multiple SFN-based beams.

Aspect 13: The method of any of aspects 8 through 9, wherein transmitting the transmission having SFN enabled or having SFN not enabled comprises transmitting one or more synchronization signal blocks (SSBs) associated with RACH beam refinement and not having SFN enabled, and wherein the method further comprises: receiving a set of RACH messages associated with the one or more SSBs via one or more RACH occasions, and determining that the set of RACH messages are associated with a single user equipment (UE).

Aspect 14: The method of aspect 13, wherein determining that the set of RACH messages are associated with a single UE comprises: determining that the set of RACH messages are associated with a single UE based at least in part on one or more of: receiving the set of RACH messages with a configured preamble hopping sequence, or receiving the set of RACH messages with a configured frequency hopping sequence.

Aspect 15: An apparatus for wireless communication at a device, comprising a processor; memory coupled with the processor; and instructions stored in the memory and executable by the processor to cause the apparatus to perform the method of one or more aspects of aspects 1-14.

Aspect 16: A device for wireless communication, comprising a memory and one or more processors coupled to the memory, the memory and the one or more processors configured to perform the method of one or more aspects of aspects 1-14.

Aspect 17: An apparatus for wireless communication, comprising at least one means for performing the method of one or more aspects of aspects 1-14.

Aspect 18: A non-transitory computer-readable medium storing code for wireless communication, the code comprising instructions executable by a processor to perform the method of one or more aspects of aspects 1-14.

Aspect 19: A non-transitory computer-readable medium storing a set of instructions for wireless communication, the set of instructions comprising one or more instructions that, when executed by one or more processors of a device, cause the device to perform the method of one or more aspects of aspects 1-14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving an indication that a base station supports single frequency network (SFN) random access channel (RACH) beam refinement for a first set of synchronization signal blocks (SSBs) and does not support SFN RACH beam refinement for a second set of SSBs;
    receiving one or more SSBs, as part of a RACH operation, the one or more SSBs associated with RACH beam refinement and having SFN enabled or having SFN not enabled, the one or more SSBs being included in the first set of SSBs or the second set of SSBs;
    transmitting a plurality of initial RACH messages associated with the one or more SSBs via a plurality of RACH occasions; and
    receiving a subsequent RACH message via one or more SFN-based beams.

2. The method of claim 1, wherein the indication is associated with the one or more SSBs.

3. The method of claim 1, further comprising:
    determining, based at least in part on the one or more SSBs having SFN enabled, that the subsequent RACH message is to be transmitted using multiple transmit receive points (TRPs).

4. The method of claim 1, further comprising:
    transmitting a second RACH message that indicates the one or more SFN-based beams that are requested for the subsequent RACH message.

5. The method of claim 1, wherein transmitting the plurality of initial RACH messages associated with the one or more SSBs via the plurality of RACH occasions comprises:
    transmitting the plurality of initial RACH messages based at least in part on a configured preamble hopping sequence that indicates that the plurality of initial RACH messages are associated with the UE.

6. A method of wireless communication performed by a base station, comprising:
    transmitting an indication that the base station supports single frequency network (SFN) random access channel (RACH) beam refinement for a first set of synchronization signal blocks (SSBs) and does not support SFN RACH beam refinement for a second set of SSBs;
    transmitting one or more SSBs, as part of a RACH operation, the one or more SSBs associated with RACH beam refinement and having SFN enabled or having SFN not enabled, the one or more SSBs being included in the first set of SSBs or the second set of SSBs;
    receiving a plurality of initial RACH messages associated with the one or more SSBs via a plurality of RACH occasions; and
    transmitting a subsequent RACH message via one or more SFN-based beams.

7. The method of claim 6, wherein the indication is associated with the one or more SSBs.

8. The method of claim 6, further comprising:
    transmitting, based at least in part on the one or more SSBs having SFN enabled, the subsequent RACH message using multiple transmit receive points (TRPs).

9. The method of claim 6, further comprising:
    receiving a second RACH message that indicates the one or more SFN-based beams that are requested for the subsequent RACH message.

10. The method of claim 6, further comprising:
    determining that the plurality of initial RACH messages are associated with a single user equipment (UE).

11. The method of claim 10, wherein determining that the plurality of initial RACH messages are associated with a single UE comprises:
    determining that the plurality of initial RACH messages are associated with a single UE based at least in part on one or more of:
        receiving the plurality of initial RACH messages with a configured preamble hopping sequence, or
        receiving the plurality of initial RACH messages with a configured frequency hopping sequence.

12. A user equipment (UE) for wireless communication, comprising:
    a memory; and
    one or more processors coupled to the memory, the one or more processors configured to:
        receive an indication that a base station supports single frequency network (SFN) random access channel (RACH) beam refinement for a first set of synchronization signal blocks (SSBs) and does not support SFN RACH beam refinement for a second set of SSBs;
        receive one or more SSBs, as part of a RACH operation, the one or more SSBs associated with RACH beam refinement and having SFN enabled or having SFN not enabled, the one or more SSBs being included in the first set of SSBs or the second set of SSBs;
        transmit a plurality of initial RACH messages associated with the one or more SSBs via a plurality of RACH occasions; and
        receive a subsequent RACH message via one or more SFN-based beams.

13. The UE of claim 12, wherein the one or more processors, to receive the indication, are configured to:
    receive the indication within a RACH configuration, or
    receive the indication within a system information block (SIB).

14. The UE of claim 12, wherein the indication is associated with the one or more SSBs.

15. The UE of claim 12, wherein the one or more processors are further configured to:
    determine, based at least in part on the one or more SSBs having SFN enabled, that the subsequent RACH message is to be transmitted using multiple transmit receive points (TRPs).

16. The UE of claim 12, wherein the one or more processors are further configured to:
    transmit a second RACH message that indicates the one or more SFN-based beams that are requested for the subsequent RACH message.

17. The UE of claim 12, wherein the one or more processors, to transmit the plurality of initial RACH messages associated with the one or more SSBs via the plurality of RACH occasions, are configured to:

transmit the plurality of initial RACH messages based at least in part on a configured preamble hopping sequence that indicates that the plurality of initial RACH messages are associated with the UE.

18. A base station for wireless communication, comprising:
a memory; and
one or more processors coupled to the memory, the one or more processors configured to:
transmit an indication that the base station supports single frequency network (SFN) random access channel (RACH) beam refinement for a first set of synchronization signal blocks (SSBs) and does not support SFN RACH beam refinement for a second set of SSBs;
transmit one or more SSBs, as part of a RACH operation, the one or more SSBs associated with RACH beam refinement and having SFN enabled or having SFN not enabled, the one or more SSBs being included in the first set of SSBs or the second set of SSBs;
receive a plurality of initial RACH messages associated with the one or more SSBs via a plurality of RACH occasions; and
transmit a subsequent RACH message via one or more SFN-based beams.

19. The base station of claim 18, wherein the one or more processors, to transmit the indication, are configured to:
transmit the indication within a RACH configuration, or
transmit the indication within a system information block (SIB).

20. The base station of claim 18, wherein the indication is associated with the one or more SSBs.

21. The base station of claim 18,
wherein the one or more processors are further configured to:
transmit, based at least in part on the one or more SSBs having SFN enabled, the subsequent RACH message using multiple transmit receive points (TRPs).

22. The base station of claim 18,
wherein the one or more processors are further configured to:
receive a second RACH message that indicates the one or more SFN-based beams that are requested for the subsequent RACH message.

23. The base station of claim 18,
wherein the one or more processors are further configured to:
determine that the plurality of initial RACH messages are associated with a single user equipment.

24. The base station of claim 23, wherein the one or more processors, to determine that the plurality of initial RACH messages are associated with a single user equipment, are configured to:
determine that the plurality of initial RACH messages are associated with a single user equipment based at least in part on one or more of:
receiving the plurality of initial RACH messages with a configured preamble hopping sequence, or
receiving the plurality of initial RACH messages with a configured frequency hopping sequence.

25. The method of claim 1, wherein receiving the indication comprises:
receiving the indication within a RACH configuration, or
receiving the indication within a system information block (SIB).

26. The method of claim 5, wherein the preamble hopping sequence indicates preambles to be selected by the UE for transmission with the plurality of initial RACH messages.

27. The method of claim 1, wherein transmitting the plurality of initial RACH messages associated with the one or more SSBs via the plurality of RACH occasions comprises:
transmitting the plurality of initial RACH messages based at least in part on a configured frequency hopping sequence that indicates that the plurality of initial RACH messages are associated with the UE.

28. The method of claim 6, wherein transmitting the indication comprises:
transmitting the indication within a RACH configuration, or
transmitting the indication within a system information block (SIB).

29. The UE of claim 17, wherein the preamble hopping sequence indicates preambles to be selected by the UE for transmission with the plurality of initial RACH messages.

30. The UE of claim 12, wherein the one or more processors, to transmit the plurality of initial RACH messages associated with the one or more SSBs via the plurality of RACH occasions, are configured to:
transmit the plurality of initial RACH messages based at least in part on a configured frequency hopping sequence that indicates that the plurality of initial RACH messages are associated with the UE.

* * * * *